United States Patent [19]

Cripe

[11] 4,316,640
[45] Feb. 23, 1982

[54] ELECTRO PNEUMATIC BRAKE SYSTEM FOR RAILWAY CAR

[75] Inventor: Christopher A. Cripe, Richmond, Va.

[73] Assignee: Bi-Modal Corporation, Greenwich, Conn.

[21] Appl. No.: 159,045

[22] Filed: Jun. 13, 1980

[51] Int. Cl.³ .............................................. B60T 13/68
[52] U.S. Cl. ........................................ 303/20; 303/15
[58] Field of Search .............. 188/153 R, 158; 303/3, 303/15–17, 20

[56] References Cited

U.S. PATENT DOCUMENTS

2,897,011  7/1959  Cotter .................................. 303/16
3,374,035  3/1968  Howard ............................... 303/20
3,560,055  2/1971  Worbols .............................. 303/20

Primary Examiner—Duane A. Reger
Attorney, Agent, or Firm—Max R. Millman

[57] ABSTRACT

An electro pneumatic system is provided for simultaneously braking a plurality of railway cars in a train. A relay valve in each car is connected between the source of air braking pressure and the brake cylinders and is responsive to the amount of air pressure within an independent air reservoir in each of the cars to apply or release the brakes. Electrical means are selectively operated to control the amount of air pressure in each independent air reservoir.

33 Claims, 6 Drawing Figures

ELECTRO PNEUMATIC BRAKE SYSTEM FOR RAILWAY CAR

Electrical controls for pneumatic train brakes have been used extensively in the past. In many such systems, a source of air pressure is generally supplied from a locomotive through various conduits through the cars in the train. The air pressure received is used to apply braking pressures through the individual brake cylinders within the cars. Various valves and other control means are used to selectively apply the brake pressures at the proper time and in the proper amounts. Often electrical means are used as part of the control means for controlling the time duration and amount of braking pressure applied via the conduit.

One of the problems in many pneumatic air braking systems used heretofore has involved the usual propagation delays between cars because of the time that it takes for transmission of the pressure from one car to another. It is normally desirable that all cars apply the brakes or release the brakes upon command. Dragging brakes within any one of the cars while the other cars have released brakes may quickly overheat the wheel and result in disintegration of the wheel and other parts relating to the system.

Some attempts have been made in the prior art to compensate for the propagation delays electrically by controlling various electrical valves by electrical signals. Generally, these electrical signals were made proportional to the amount of braking desired. These electrical controls have generally required the constant application of relatively high power to achieve their desired results. Also, the electrical systems have generally been very complex and normally do not perform efficiently for very long trains. For example, while such electrical systems may often operate satisfactorily for a train having 15 cars, they generally prove deficient in some respects because of their complexity when trains having 75 cars are involved, for example.

Another problem found in the use of many prior art electrical systems in long trains has been the very high power losses involved. These losses become prohibitive, especially if the power is on for long periods of time, because it is difficult to compensate for voltage drops as the electrical system becomes increasingly longer.

Brake control is of primary importance in designing a good brake system. For example, it may be desired to apply the brakes until the train has decelerated to a certain speed at which time the speed is to be maintained without additional braking. During the time of maintaining the speed, it may sometimes be necessary or desirable to re-apply and release the brake slightly to retard the train or to allow it to accelerate somewhat. At all times, it is desirable to be able to maintain the train at some set speed by the application or release of the brakes. It is very difficult to achieve such brake control with electrical systems involving varying currents to control air valves.

In any event, it appears that each car in a train must be treated individually with respect to the braking system. At the same time, it is apparent that a central control system must be present to control all the cars in the train.

A mandatory consideration in the design of any brake system requires it to have fail-safe operation. It is necessary in an electrical system that the braking power be applied to the brake cylinders in the maximum amount, if the electrical power fails. Some of the prior art systems do not include a fail-safe feature.

In practicing the present invention, means must be provided to make the existing systems compatible with the means used to implement the invention. In some cases it may be desirable to use an adaptor car wherein there are controls taking the normal pressures applied from the locomotive and converting them to the form necessary to operate the braking system in each of the cars modified to take advantage of the present invention. Alternately, it may be desirable to have an electrical controller within the locomotive whereby the engineer may manually actuate various switches to operate the braking systems in each of the cars of the train which incorporate the features of the present invention. Cars employing the present invention cannot be intermingled with cars employing existing systems, except possibly at the tail-end of a train of such cars.

It is an object of this invention to provide an electro pneumatic braking system in which braking is simultaneously applied among the wheels of the train.

It is a further object of this invention to provide an improved electro pneumatic braking system in which low current electrical power is utilized to minimize transmission losses and power consumption.

It is still a further object of this invention to provide an improved electro pneumatic system in which the amount of air consumed during the application of the brakes is minimized.

It is still a further object of this invention to provide an electro pneumatic braking system for railway trains in which the brakes may be recycled quickly without loss of control.

It is still a further object of this invention to provide an improved electro pneumatic braking system in which improved control of the braking is obtained allowing different levels of braking to be maintained.

It is still a further object of this invention to provide an improved electro pneumatic braking system in which all the brakes may be released quickly with no requirement for repressurizing a long conduit to obtain the brake release.

It is still a further object of this invention to provide an improved electro pneumatic braking system in which braking control is achieved by relatively simple electrical circuits rather than complex highly sensitive graduating air valves.

It is still a further object of this invention to provide an improved electro pneumatic brake system for a railway train in which complexity and weight is minimized.

In accordance with the present invention, an electropneumatic brake system for applying braking pressures to a plurality of cars in a train is provided. A source of compressed air is connected to a storage reservoir provided in each car. A supply of air at a regulated constant pressure is selectively applied from the storage reservoir to a rate reservoir in each car in accordance with the selective operation of electrical means. A modulating relay valve is connected between the storage reservoir and the brake cylinders in each car. The pressure from the rate reservoir controls the operation of the relay valve to permit braking pressure to be applied to the brake cylinders in accordance with the pressure built up in the particular rate reservoir within the car.

Other objects and advantages of the present invention will be apparent and suggest themselves to those skilled in the art, from a reading of the following specification and claims, in conjunction with the accompanying drawings, in which:

Figure 1:
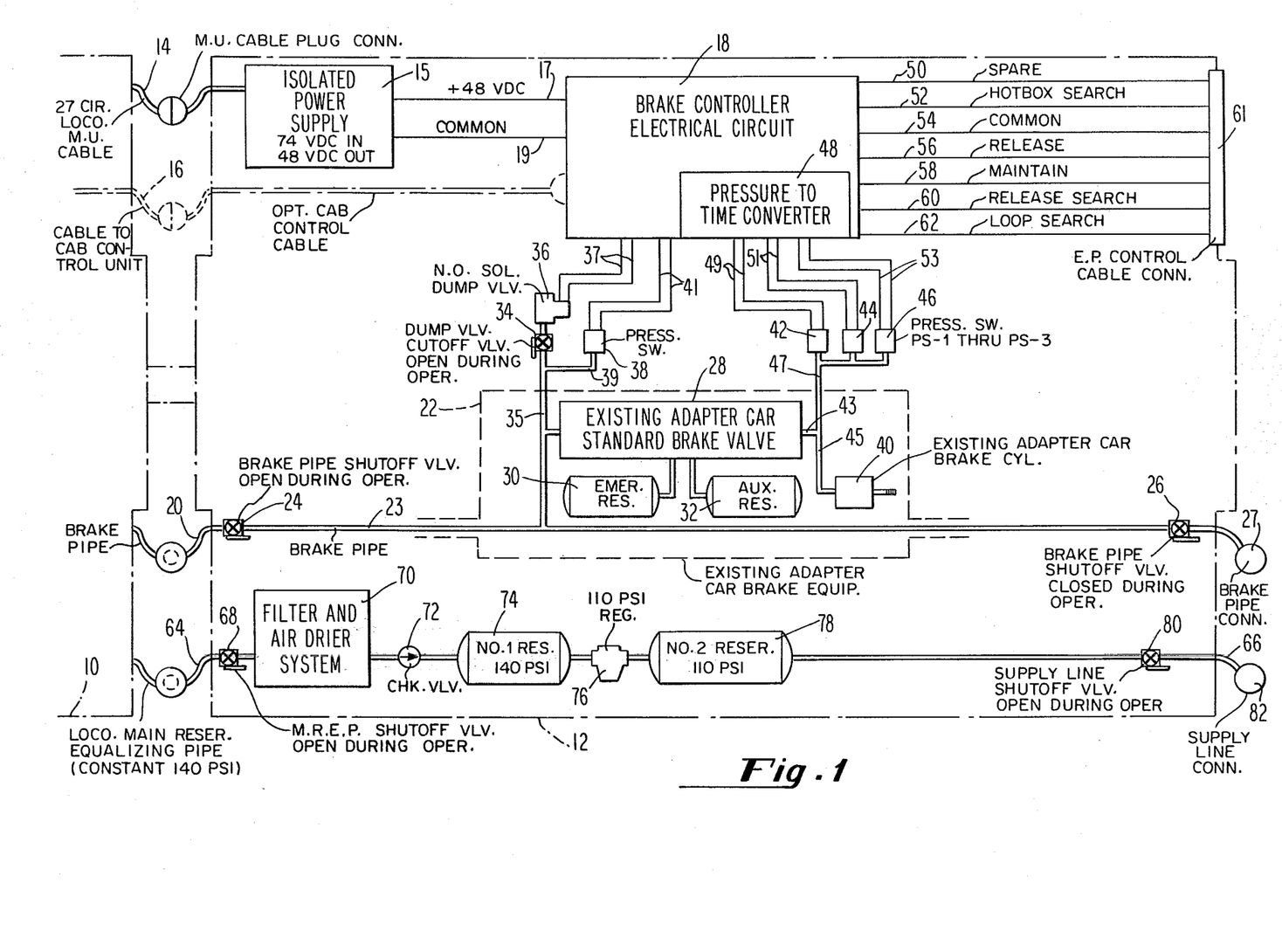
FIG. 1 is a diagram, partly schematic and partly in block diagram form, illustrating an adaptor car which may be used in connection with the present invention.

Referring to FIG. 1, a locomotive 10 includes a number of connectors connected to an adaptor car 12. An electrical cable 14 carries electrical power from the locomotive 10 to an isolated power supply unit 15. The electrical output from the isolated power supply 15 applies power to a brake control electrical circuit 18 through leads 17 and 19. This controller will be described in detail in connection with FIGS. 3, 4 and 5. An electrical cable 16 between the locomotive 10 and the adaptor car 12 provides an optional cable for the cab control unit. The cable 16 is connected to the brake controller unit 18 for optional use when needed.

A brake pipe 20 is connected from the locomotive 10 through a brake pipe shutoff valve 24 and a brake pipe 23 to adaptor car brake equipment 22. The brake pipe 23 extends to the rear of the adaptor car 12 to another shutoff valve 26 which is generally closed during operation. The brake pipe terminates at gladhand 27 and is not used in the braking system for the rest of the cars in the present invention.

The adaptor car brake equipment 22 includes conventional braking items including a standard brake valve 28, an emergency reservoir 30 an auxiliary reservoir 32.

The adaptor car brake unit 22 includes the pipe line 23 leading to an input conduit 35. The conduit 35 is also connected through a cutoff valve 34 to a normally open solenoid dump valve 36. The solenoid 36 is connected by suitable leads 37 to the brake controller unit 18. The conduit 35 is also connected through conduit 39 to a pressure switch 38. The pressure switch 38 is connected through suitable leads 41 to the brake controller unit 18.

The output pressure from the standard brake valve 28 is applied through conduits 43 and 45 to the existing car brake cylinder 40 and also through conduits 43 and 47 to a plurality of pressure switches 42, 44 and 46. The pressure switches 42, 44 and 46 are connected through suitable leads 49, 51 and 53, respectively to a pressure to time converting unit 48 within the electrical controller, which will be described in detail.

Figure 2:
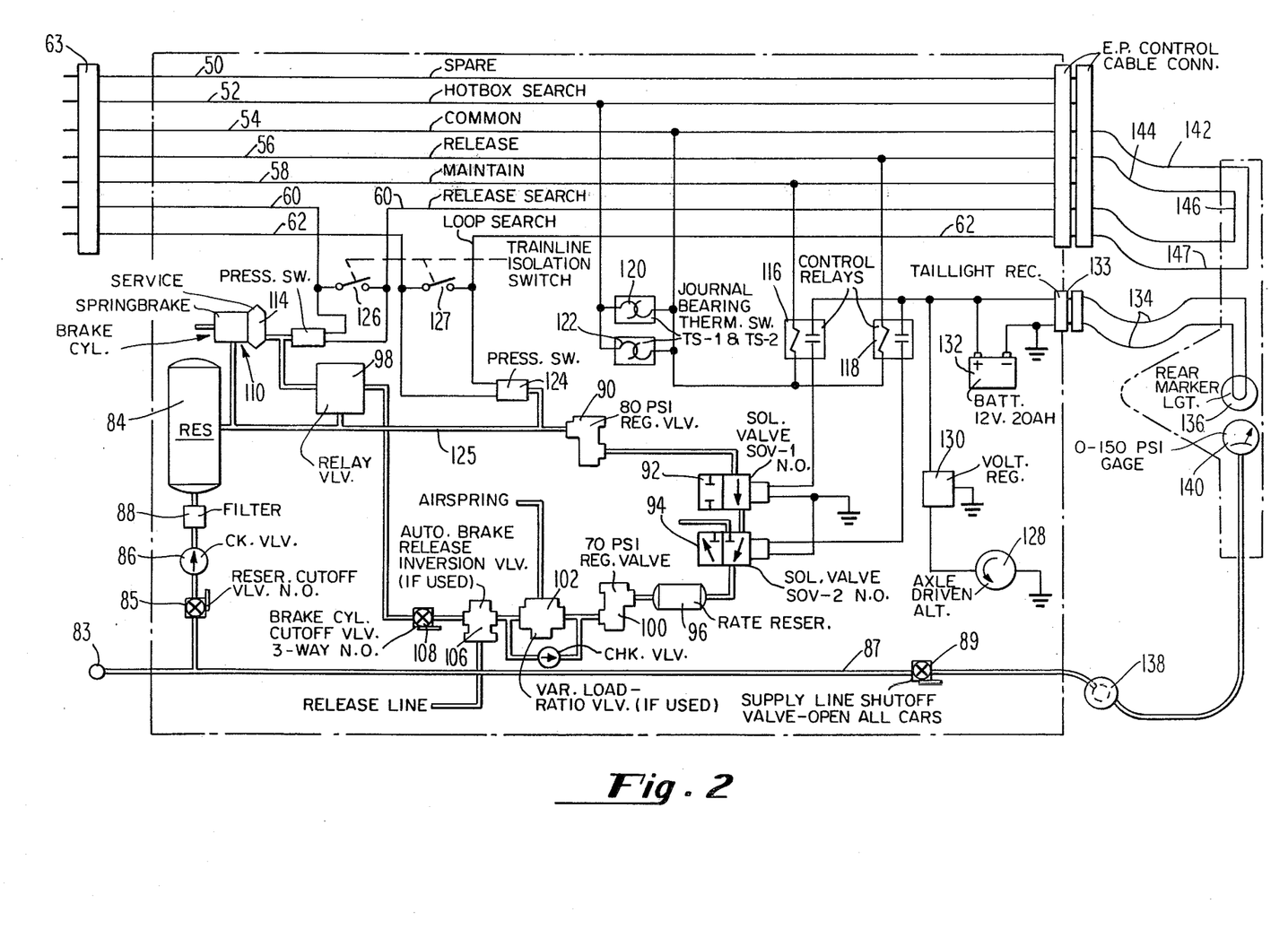
FIG. 2 is a schematic diagram illustrating one of the cars in a train incorporating the present invention and which may be connected to the adaptor car of FIG. 1.

A plurality of conductors including a spare conductive lead 50, a hot box search lead 57, a common lead 54, a release lead 56, a maintain lead 58, a release search lead 60 and a loop search lead 62. All of these leads are connected to similar connector unit 63 into a basic car, as illustrated in FIG. 2. The functions of all the leads will become apparent as the subsequent figures of the drawings are described.

A third pipe or conduit 64 from the locomotive 10 passes through various elements in the adaptor car 12 to an output pipe 66 and connector 82 and is carried through all of the subsequent cars in the train. The pipe 64 comprises the main reservoir equalizing pipe and supplies air at a constant pressure of 140 psi. Compressed air is transmitted through the pipe 64, a shutoff valve 68 which is open during operation, a filter and air dryer system 70, a check valve 72, a first reservoir 74 maintaining a pressure of approximately 140 psi, a pressure regulator 76 regulating the pressure at approximately 110 psi, a second reservoir 78, the supply line shutoff valve 80 which is normally open during operation, and finally to the output conduit 66.

Compressed air from the locomotive is supplied through all the cars constantly by the supply line.

In the typical car illustrated in FIG. 2, the air from the output supply line connector 82 is connected to an input connector 83.

Referring particularly to FIG. 2, the supply line 87 supplies compressed air to a storage reservoir 84 through a reservoir cutoff valve 85, a check valve 86 and a filter 88. Air from the storage reservoir 84 at approximately 100 psi is led through a pressure regulator valve 90, which regulates the pressure at 80 psi, for example. The air at 80 psi from the regulating valve 90 is fed through a pair of solenoid operated valves 92 and 94 into a small fixed volume tank rate reservoir 96. The regulated air will fill the rate reservoir 96 at a controlled, repeatable rate because the feed pressure and the feed volume can be held relatively constant. Thus, by adjusting the variables of feed pressure, valve orifice size, and rate reservoir volume, almost any rate of pressure build up over time may be obtained. By using the pressure of the rate reservoir 96 to control a single graduating relay valve 98 to admit air from the storage reservoir 84 into the brake cylinders, the effects of different brake cylinder volume and strokes, i.e. travels due to brake shoe wear, remain isolated from the primary control provided by pressure build up in the rate reservoir 96. After passing through other elements, which will be mentioned, the pressure from the rate reservoir 96 is applied to the control port of the relay valve 98. The relay valve 98 follows the presssure build up in the rate reservoir 96. Control of pressure build up is accomplished by operation of the solenoid operated valves 92 and 94 as will be subsequently described.

Between the rate reservoir 96 and the relay valve 98 are a regulating valve 100 which limits the pressure to approximately 70 psi to limit the maximum brake cylinder pressure, a variable load ratio valve 102, which is sometimes used in vehicles with air suspensions, leading to a conduit 104 going to an air spring. The variable load ratio valve 102 may also be connected to an automatic brake release inversion valve 106 which is sometimes used in special cases. A check valve 108 is connected across the variable load ratio valve 102, if used. The output pressure from the brake release inversion valve 106 is applied to the relay valve 98 through a brake cylinder cutoff valve 108.

Brake cylinders 110 include a spring brake portion 112 and a service portion 114. The spring brake portion 112 remains released as long as pressure in reservoir 84 is above approximately 65 psi. The pressure from the storage reservoir 84 is applied through the relay valve 98 to the service portion 114 of the brake cylinder to apply service pressure to the brake. The amount of pressure applied from the storage reservoir 84 to the service portion 114 of the brake cylinder 10 is dependent upon the amount of air admitted to the rate reservoir 96 and consequently the pressure build up therein.

This in turn is controlled by selectively operating either or none of the valves 92 and 94.

Generally when the solenoid operated valves 92 and 94 are both deenergized, air pressure will built up in the rate reservoir 96 until it reaches the pressure of the output of the regulating valve 90. Thus, it is seen that a lack of electrical power will result in a maximum brake application. This provides a fail-safe feature for the system. It could also serve as a parking brake mode to avoid power consumption while the train is parked.

The solenoid operated valves 92 and 94 are selectively operated to release the brakes by energizing the solenoid operated valve 94 while the solenoid operated valve 92 remains deenergized. When energized, the solenoid operated valve 94 will block the flow of air from the solenoid operated valve 92, while exhausting the pressure from the rate reservoir 96. This in turn causes the relay valve 98 to exhaust pressure in the service section 114 of the brake cylinder 110.

When it is desired to make a less than maximum brake application, both solenoid valves 92 and 94 are deenergized for the amount of time necessary for the desired pressure to build up in the rate reservoir 96 and therefore an equal pressure in the service chamber 114 of the brake cylinder 110 because of the operation of the relay valve 98. At the desired time, power is applied to a solenoid operated valve 92, while the solenoid operated valve 94 remains deenergized. This closes the passage of air from the regulating valve 90 in the rate reservoir 96. Because further pressure build up in the rate reservoir 96 is prevented by the solenoid operated valve 92, the application of pressure will be maintained at the pressure already obtained. Thus, by controlling the amount of time the controlled build up in the rate reservoir 96 is allowed to continue, any amount of brake cylinder pressure may be obtained and held as desired. As mentioned, this offers advantages in the operation of the system.

As will be described in detail, the solenoid operated valves 92 and 94 are controlled by control relays 116 and 118, respectively. As illustrated, the control relay 116 is connected to the maintain lead 58 leading through the connector 63 to the control unit 18 (FIG. 1). The control relay 118 is connected to the release lead 56 which also goes back through the connector 63 to the control unit 18 which may be in an adaptor car.

FIG. 2 includes a number of elements directly related to the invention, but included in the system for additional safety. These include journal bearing thermostatic switches 120 and 122. These are connected between the hot box search lead 52 and the common lead 54 both which go back to the control unit 18 through the connector 63.

A pressure switch 124 is connected in the loop search lead 62. This switch is connected in series with other pressure switches in other cars of the train. The pressure switch 62 is connected to the storage reservoir 84 through a conduit 125 to detect the pressure in the storage reservoir 84. When the pressure in the storage reservoir 84 drops below a safe operating level, the braking system is automatically applied to all the cars in the train.

Pressure switch 113 is connected by a conduit to the service chamber of the brake cylinder and is used to detect incomplete release of the brakes. Pressure in the cylinder opens switch 126 in "release search" line 60 if the brake system is in the "release" mode as will be described later. These switches are connected to similar switches in the other cars of the train.

Train line isolation switch 127 is connected in the loop search lead 62. This switch is also connected to other similar switches in the other cars of the train.

A basic car, incorporating features of the invention may also include an axle driven alternator 128, a voltage regulator 130, and a battery 132. The output from the battery 132 is connected through a tail light receptable 133, through leads 134 to a rear marker light 136 on the last car, and also supplies electrical power for solenoid valves SOV-1 and SOV-2 on each car.

The supply line pressure from the input connector 83 passes through conduit 87, through a valve 89, to the rear cars through a gladhand connection 138 which on the last car is connected to a gauge 140, so that pressure at the rear of the train can be readily determined.

The common lead 54 and the release lead 56 are connected through leads 142 and 144 to loops 146 and 147 which are connected back to the release search lead 60 and loop search lead 62, respectively, forming a circuit through all the other cars in the train.

In the present invention, each car is equipped with the electro pneumatic brake system described above and will respond to on-off electrical commands rather than pressure changes in a brake pipe. It is necessary, therefore, unless properly equipped dedicated locomotives are available, to convert the conventional brake command information from the engineer into the form usable by the cars equipped with the electro pneumatic systems incorporating the present invention.

This is accomplished by use of a brake controller 18 illustrated by a block in FIG. 1 and to be described in detail in connection with FIGS. 3, 4, and 5.

Basically the controller 18 performs a number of functions. First, it converts the standard brake system pressure changes into electrical commands for each car. The controller also enables manual control of the brakes for quicker response should the enginemen desire it. Next, the controller provides verification functions to insure that all cars are responding properly to commands and further provides monitoring functions to insure all reservoirs of the system are properly charged at all times. Next, it provides head end automatic braking should a train separation occur. It provides a parking brake function to eliminate current consumption when the train is stopped for an appreciable length of time. It also provides a set-out function for setting out malfunctioning cars from a train, dropping a section of the train at a stop point, or cycling the brakes to locate a malfunctioning car in a train. Finally, it provides an on board hot box detection for the cars.

The basic function of the controller circuit 18 is to apply command power to the cars to release the brakes, apply the brakes or to maintain the brakes. This is accomplished by selectively actuating the solenoid operated valves 92 and 94 on each car. The controller unit circuit 18 provides four discrete steps of braking for the cars. This would normally be adjusted to provide the following brake cylinder pressures on each car: First, it could provide 20 psi brake cylinder pressure which is a very light brake application. Next, it could provide 40 psi brake cylinder pressure which may be the normal application. Next it could provide a 60 psi brake cylinder pressure which is the full service application of the brake. And finally, it could provide an emergency pressure of 70 psi to the brake cylinder. It is apparent, however, that more steps may be incorporated with an increase in the complexity of the control circuit, if desired.

Figure 3:
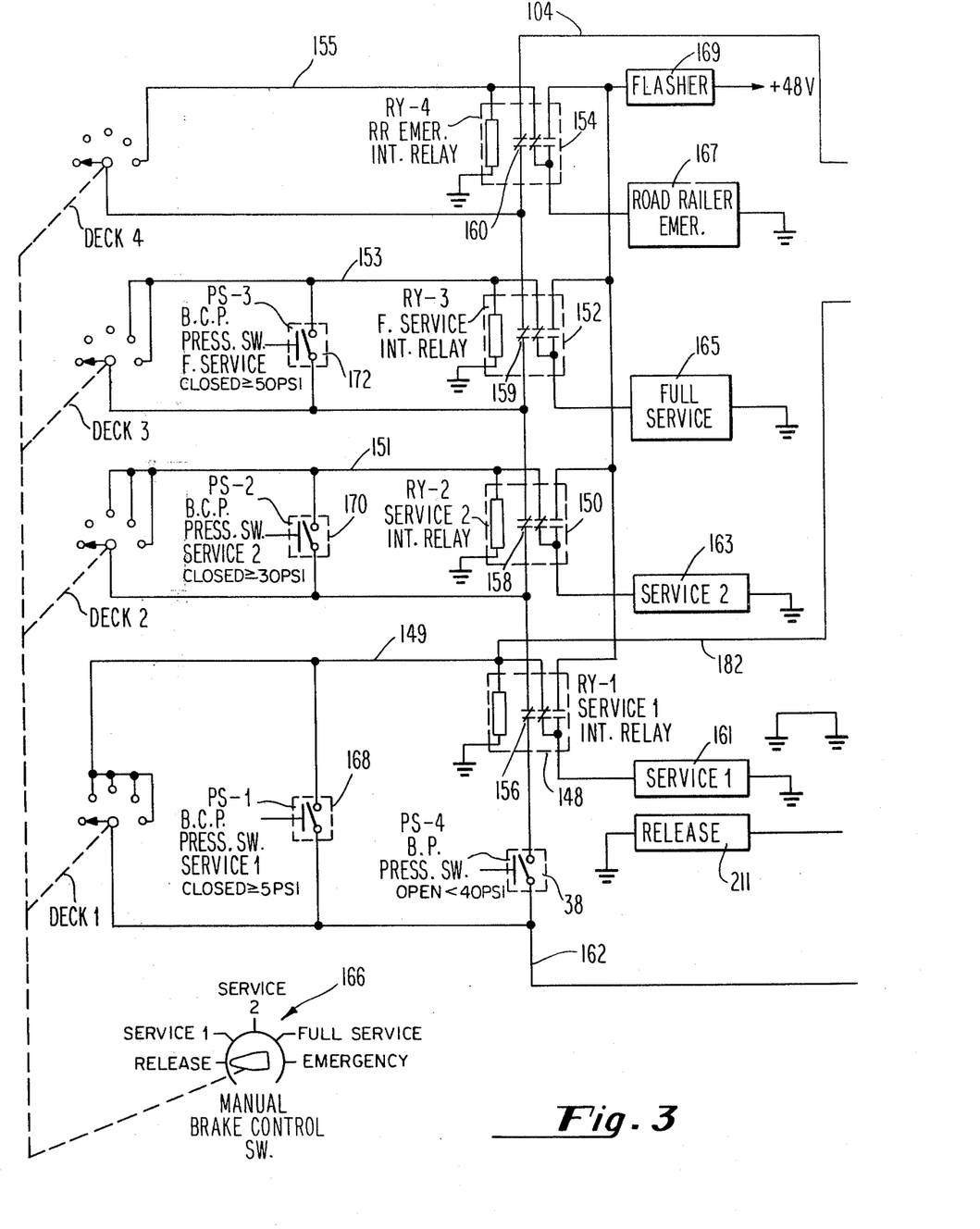
FIGS. 3, 4 and 5 are composite schematics of a brake controller system in accordance with the present invention; the composite drawing may be formed by overlaying the figures, joining x-x of FIG. 3 to x-x of FIG. 4; y-y of FIG. 3 to y-y of FIG. 5 and z-z of FIG. 4 to z-z of FIG. 5.
Figure 4:
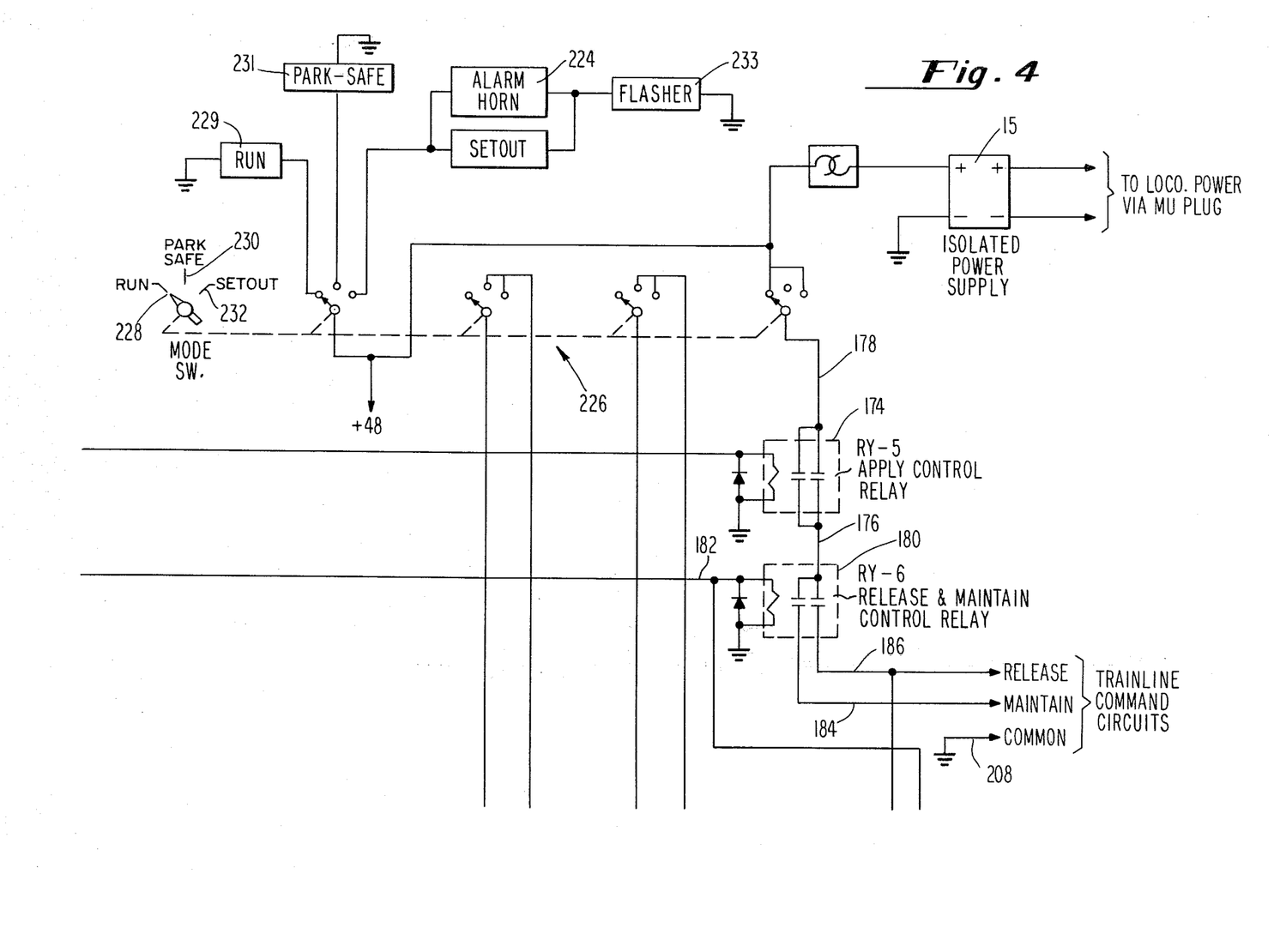
Figure 5:
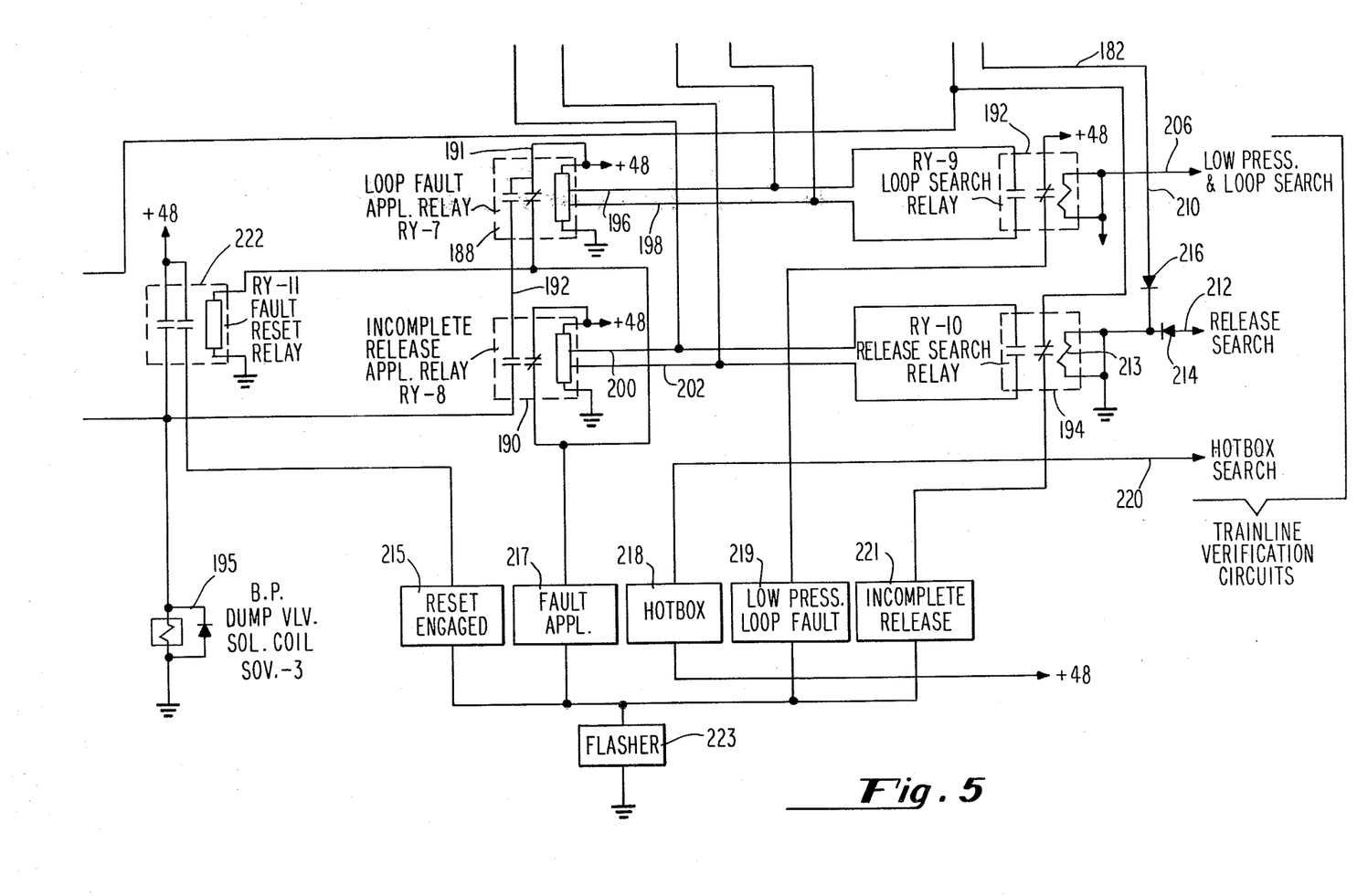

Referring to FIG. 3, the circuitry illustrated may be considered as the pressure to time converter 48 (FIG. 1), which is utilized in conjunction with FIGS. 4 and 5 of brake controller 18. The timing function for interrupting the power to the car for the desired brake applications are handled by four substantially similar interval delay relays 148, 150, 152 and 154. When power is applied to any of the input leads 149, 151, 153 or 155 of any of the relays 148, 150, 152 or 154, respectively, the contacts in the relays immediately transfer for an adjustable length of time, after which they revert back to their original positions. The reset of the relays is accomplished by removing power from the respective input leads 149, 151, 153 or 155.

Contacts 156, 158, 159 and 160 in the relays 148, 150, 152, and 154, respectively, are connected in series and any one of the four can interrupt the flow of current from a lead 162 to a lead 164. The interruption may be for a present period of time.

The power applied to each of the input leads of the relays 148, 150, 152 and 154 is controlled either by a manually controlled brake control switch 166 or by pressure switches 168, 170 or 172 (which are 42, 44 or 46 on FIG. 1) connected into the adaptor cars brake cylinder line. Thus when the engineman applies the brakes, the adaptor car brake cylinder pressure will increase, first closing the pressure switch 168, which in turn applies power through lead 149 to the relay 148, which opens contacts 156 to interrupt the current from lead 162 to 164. This current is interrupted for the time interval that interval relay 148 is adjusted for, which results in 20 psi brake cylinder pressure on each car.

A further increase in the brake cylinder pressure closes pressure switch 170, causes power to be applied through lead 151 to the relay 150 causing contacts 158 to open and interrupt current from leads 162 and 164 for its preset time interval. A still further increase in the brake cylinder pressure closes pressure switch 172 which causes power to be applied through the lead 153 to relay 152 causing contacts 159 to open the current path between leads 162 and 164 for its preset time interval.

Alternatively, the manual brake control switch 166 may be used if the brake controller 18 is located in the locomotive cab, thus making it unnecessary to use the adaptor car brakes with their attendant slower response time.

Indicators 161, 163, 165 and 167 are connected to contacts on the relays 148, 150, 152 and 154 to indicate the operating conditions thereof. A flasher 169 is also connected to contacts on all of these relays.

Relays 148, 150, 152 and 154 operate serially thus preventing overlapping their interval periods. Any time relay 148 through relay 154 interrupts the current from leads 162 to 164, a relay 174 (FIG. 4) will become deenergized. As illustrated in FIG. 4, when the relay 174 becomes deenergized, current from lead 176 to lead 178 is interrupted. This prevents power from being applied to the cars for the duration of the current discontinuance, i.e., for the duration of the time interval involved, thereby producing the desired amount of braking in the cars.

Anytime that brakes are applied, pressure switch 168 or its manual control equivalent will be closed and remains closed until brake release is desired. Thus, pressure switch 168 is also used to maintain whatever application is desired and performs this function by applying current through lead 182 to relay 180 (FIG. 4). As a result, current is directed to maintain line 184 when the interruption of current has been completed by any of the interval relays 148, 150, 152, or 154, and power is restored to the coil of relay 174. This in turn energizes the solenoid valve 92 (FIG. 2) on each equipped car via control relay 116.

Conversely, when brake release is desired, the pressure switch 168 or its manual equivalent is opened. It cuts off the current to the relay 180 (FIG. 3) and power is directed from the lead 176 to lead 186, which is the release line 56 (FIG. 1). This causes the solenoid operated valve 94 on each equipped car to become energized. As illustrated in FIG. 2, the release line 56 is connected to the control relay 118, which actuates the solenoid operated valve 94. The system described thus far is direct release only. Thus relays 148, 150, 152 and 154 (FIG. 3) with relays 174 and 180 (FIG. 3) operate to convert either a pressure rise in the adaptor car brake cylinder or a manual brake control switch command into a time interval command usable for the equipped cars.

To insure that all the cars in a train respond properly to the commands given by the brake controller 18 (FIG. 1), through the train line command circuits, and to automatically apply emergency brakes should a fault occur, a circuit as illustrated in FIG. 5 is employed. Referring to FIG. 5, relays 188, 190, 192 and 194 are employed. As illustrated, the current applied to the lead 162 in FIG. 3 is actually provided by current from a lead 191 through the relay 188, to a lead 192 through relay 190. Thus for normal operation, the relays 188 and 190 must remain energized allowing current from lead 191 to lead 162. Any interruption of current will cause the brakes on the equipped cars to be applied.

In addition, a solenoid operated normally open valve 194 is connected to the lead 162 and piped into the locomotive adaptor car brake pipe (item 36, FIG. 1). Thus, loss of current at lead 162 will open the solenoid operated valve 194 venting the locomotive adaptor car brake pipe, allowing the locomotive and adaptor car emergency brake to be applied. Pressure switch 38 (FIG. 3) is also connected into the brake pipe, and opens at a level below 50 psi, thus interrupting current from lead 162 to lead 164. This occurs if the brake pipe is vented by an emergency application whether initiated by relay 188 or 190 or manually by the engineer, thus applying emergency brakes to the equipped cars.

Relays 188 and 190 are delay on release types. As long as their input terminals or leads are connected together, they will remain energized. The input terminals or leads to the relay 188 include leads 196 and 198. Input terminals or leads to the relay 190 include the leads 200 and 207. Opening the connection between leads 196 and 198 or between leads 200 and 202 will not deenergize either of the respective relays 188 or 190 until a preset time delay has occured, at which point the contacts in the affected relay will transfer to the deenergized position. Thus, intermittence which may occur in the train line verification circuit will be ignored by the relays 188 and 190, thus preventing false emergency application due to short transient interruptions.

Relays 188 and 190 are controlled by relays 192 and 194, respectively. These latter relays must remain energized in order to keep the relays 188 and 191 energized. The relay 192 performs two verification functions in the circuit. It protects against low reservoir pressure on the equipped cars and provides the head end emergency braking function should a train break-in-two occur. The coil 204 of the relay 192 is connected to a source of power indicated as being +48 volts. The other side of the coil is returned to ground through a lead 206 and pressure switches 124 on each of the equipped cars (FIG. 2). The lead 206 is connected to the loop search line 60 (FIG. 2) which is connected in series with the pressure switches 124 in each of the cars. On the rear end of the last car (FIG. 2), a jumper wire 147 is installed connecting lead 206 (i.e. loop search line 60) and all its series pressure switches to a common wire 208 (FIG. 4) in the train line, which is connected to the common line 54 (FIG. 2). The pressure switches 124 are arranged to open below a minimum safe storage reservoir 84 (FIG. 2) pressure on each car. Thus, if the storage reservoir 84 pressure in any car drops below a safe value, its pressure switch 124 will open breaking the ground return to the relay 192. The relay 192 will open the circuit between the leads 196 and 198 of the relay 188, which in turn will open the circuit between the lead 191 and the lead 162 after its delay period has elapsed. This in turn produces and emergency brake application as previously described. Likewise, a train break-in-two will separate the train line cable between cars to produce an emergency brake application.

The function of the relay 194 is to insure that all cars release their brakes upon command. This is extremely important since a dragging brake quickly overheats a wheel and results in its disintegration. Current is supplied to the relay 194 through a lead 186 (FIG. 4), (56 FIG. 2) whenever the brakes are in the release mode. On the rear end of the last car of the train, a jumper 146 (FIG. 2) is installed from lead 186 to lead 212. The latter lead includes all the pressure switches 113 (FIG. 2) on each car which are wired in the release search line in series. An indicator 211 (FIG. 3) indicates the condition of the release line The lead 212 returns to the brake control at the head end of the train and applies current to the coil 213 of the relay 194 through blocking diode 214 as long as pressure switches 113 (FIG. 2) remain closed. The pressure switches 113 are arranged so that they open approximately at a pressure of about 5 psi, thus any residual brake cylinder pressure on any car will break the circuit through the coil 213 of the relay 194, which in turn will cause the relay 190 to deenergize after a delay period has elapsed. This initiates an emergency brake application by breaking the current path between the lead 192 and the lead 162.

When a brake application is made, current from the lead 182 is routed through a blocking diode 216 to keep the relay 194 energized when it is normal for the pressure switches 113 to open due to brake cylinder pressure build up.

The hot box warning system consists of a warning light 218 whose ground return is through a train line wire 220 to a series of parallel wired snap action thermostatic switches 120, 122 (FIG. 2), with one switch being disposed on each wheel bearing on each car. Should the bearing temperature exceed the set point of the switches, they close and complete a ground return to the common lead 208 thereby illuminating the hot box warning light 218.

Should an emergency brake application be initiated by either the relay 188 or 190 and current flow is broken between the lead 191 and 162, the reset of the circuit is accomplished by a relay 222. Relay 222 is a delay on operate type and power applied to its input terminals will not cause the relay to energize until its delay has elapsed. Current may be supplied through the relay 222 if either the relay 188 or 190 becomes deenergized and its delay adjusted so that a sufficient period of time is allowed for a complete stop to be made before the relay 222 reenergizes the line 162, thus closing the solenoid operated valve 195 (36 FIG. 1) and allowing the locomotive adaptor brake pipe to be recharged. When the cause of the problem is remedied and the power is restored through relay 192 and/or relay 194, the relay 222 will revert to its deenergized state and all automatic safety functions will be restored.

FIG. 5 includes various indicator or warning lights which are connected to indicate the operating conditions. These include a "reset engaged" light 215 connected to relay 222, a "fault" light 217 connected to relay 190, a "low pressure loop fault light" 219 connected to relay 192, and and "incomplete release light" 221 connected to relay 194. A flasher 223 is connected in series with each of the last four mentioned lights.

The upper portion of FIG. 4 includes circuitry and a ganged manually operated switch 226 which is used to select the desired operating mode of the system. All discussion thus far has assumed the switch to be in the first or "run" position 228 as illustrated. A light 229 may be connected to a source of +48 volts when the switch is in this position. This position is used for all normal operating conditions and "enables" all automatic safety functions. The "park safe" position 230 is used when the train is to be stopped for extended periods or when cables between the cars are to be manually connected or disconnected. A light 231 may be connected to +48 volts in this position. The "park safe" position disconnects current from the lead 178 enabling cables between cars to be connected or disconnected without shock hazard, and also causing all the equipped cars to apply their brakes to maximum while eliminating the power consumption of the solenoid operated valve 92 and 94 in each car. This position also bridges terminals or leads 196 and 198 on relay 188 and terminals or leads 200 and 202 on relay 190, thus preventing loss of current at the lead 162 and inadvertently venting the locomotive adaptor car brake pipe. This position would normally also be used for moving the locomotive adaptor car equipment before any equipped cars are coupled to the train.

The "setout" position 232 of the mode switch 226 also bridges the leads or terminal 196 and 198 of the relay 188 and leads or terminals 200 and 202 of the relay 190, thus defeating the automatic safety system and preventing the solenoid operated valve 195 from venting the locomotive adaptor car brake pipe as described above, but restores current to the conductor 178, thus enabling the brakes to be applied or released at will. Since this position defeats the safety system, but allows brake releases, an alarm horn 224 is engaged in this position and cannot be defeated. A setout light 227 and flasher light 233 are also connected when the switch is in the "setout" position. This position is useful for setting out cars from within or at the rear of the train, where it is necessary to move the train a short distance without the train line verification loop circuits completed. It is also useful because the brakes may be cycled as required even if a car has malfunctioned and caused an automatic emergency application, thus allowing the trainmen to locate the car that is not properly responding to the cycling procedure.

Figure 6:
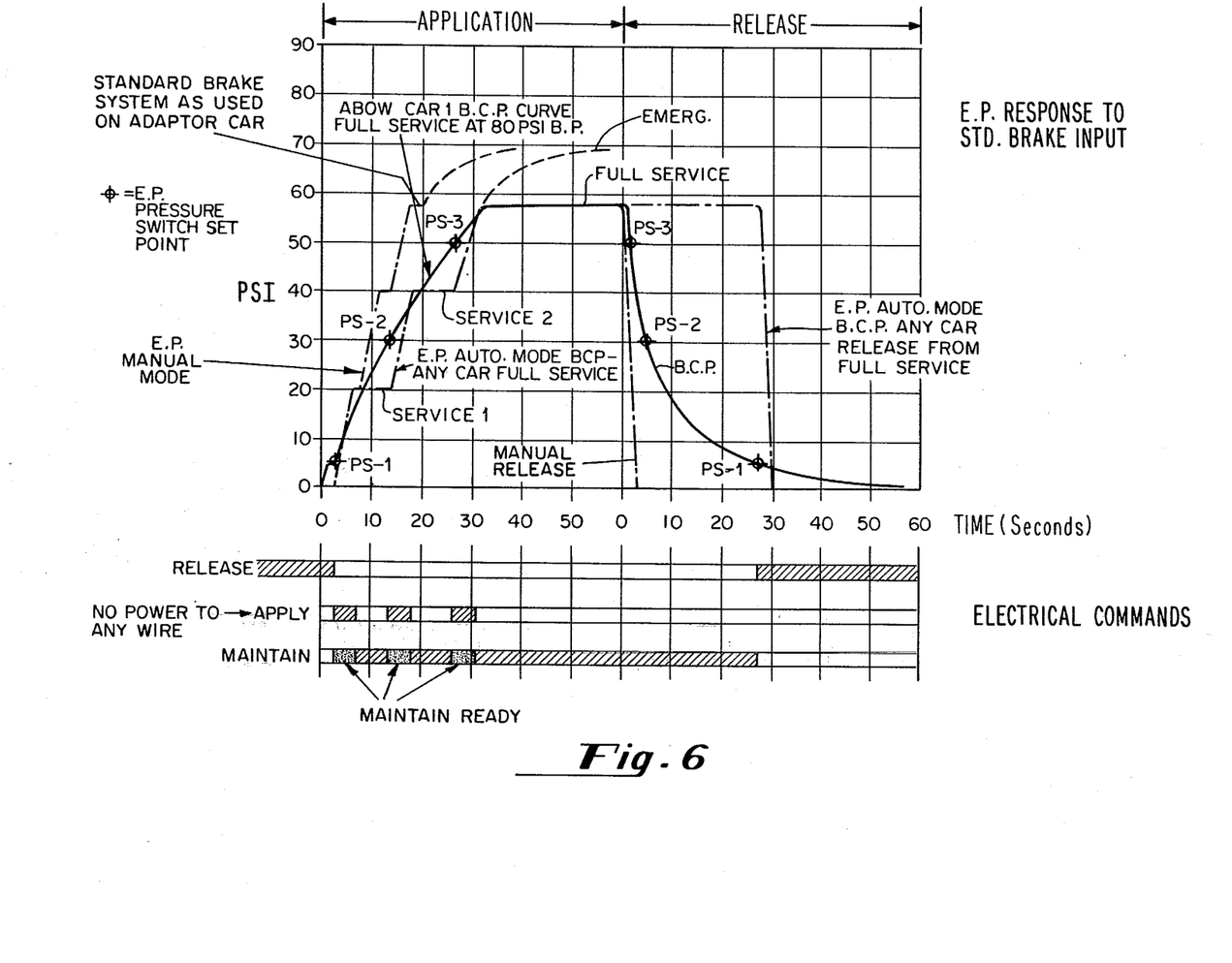
FIG. 6 is a chart indicating pressure versus time illustrating the operation of the application and release of brakes in a brake system in accordance with the present invention.

Referring to FIG. 6, response curves plotting pressure versus time are illustrated, along with various electrical commands. This chart may be related particularly to the circuitry illustrated in FIG. 3, although it is apparent the other figures of the drawings should also be considered. The curves indicated relate to automatic operation, where the brake controller 18 (FIG. 1) follows commands of the adaptor car standard brake system, rather than operation by manual control switch 166. This operation is illustrated by dashed lines. The operation by applying brake pressure to operate pressure switches 168, 170 and 172 is also illustrated by the solid curved line. Manual control by switch 166 (FIG. 3) would allow much quicker response.

As described, the brake controller circuit 18 (FIG. 1), which is illustrated in detail in composite FIGS. 3, 4 and 5, provides four discrete steps for braking the cars.

By way of example in the embodiment of the invention illustrated, these would normally be adjusted to provide predetermined brake cylinder pressures. First, the operation of the system by operating the switch 166 (FIG. 3) will be described.

Prior to application of the brake the electrical command is a signal representing "release". At this time the brake pressure is zero, as indicated in the curve.

When the brake "Service 1" is connected as by the selection on the switch 166 (FIG. 2), a pressure of 20 psi is applied to the brake cylinder, this being equivalent to a light application. During this time, as indicated by the electrical commands in the chart of FIG. 6, no power is applied to operate either of the solenoid operated valves 92 or 94 (FIG. 2) thereby keeping them deenergized. Pressure is built up in the rate reservoir 96 by pressure passing thereto from the storage reservoir 84 through the open valves 92 and 94 (FIG. 2). The amount of pressure built up in the rate reservoir 96 is dependent upon the duration of time that no electrical signal is applied to the solenoid operated valves 92 and 94. As previously described, the pressure in the rate reservoir 96 controls the valve 98 which in turn controls the braking pressure applied from the storage reservoir 84 to the brake cylinder 110. When the electrical signal is reapplied, no further pressure is passed through the valves 92 and 94. A "maintain" signal at line 184 (FIG. 4) is applied to the relay 115 to energize and close the valve 92. Thus the pressure is maintained at level "Service 1" as indicated in the chart.

If it is desired to increase the brake pressure from 20 psi to 40 psi, for example, the switch 166 is moved to the "Service 2" position. This pressure is approximately equivalent to normal braking pressure. At this time, no power is applied to either of the valves 92 or 94 again permitting pressure to pass from the storage reservoir 84 to the rate reservoir 96. The pressure in the rate reservoir 96 increases, in turn causing the relay valve 98 to increase the brake cylinder pressure. Again the pressure is maintained at the "Service 2" level by a "Maintain" signal closing the solenoid operating valve 92.

When full service pressure is desired, the switch 166 is moved to the "Full Service" position. The braking pressure may be 60 psi at this position, for example. Again, the electrical signals to the solenoid operated valves 92 and 94 are discontinued to open the valves and to apply pressure from the storage reservoir to the brake cylinders 110 in the manner described above in connection with the "Service 1" and "Service 2" positions. The level of the "Full Service" pressure level is illustrated in the diagram.

When the switch 166 is moved to the "Emergency" position, the applied pressure may continue to the level indicated by the dashed lines in the chart, limited by regulating valve 100 (FIG. 2) on each car. A dashed line from the "Full Service" level indicates the pressure increase when the switch 166 is moved away from "Full Service" to "Emergency".

Regarding the solid curve on the chart, this represents the response of the standard "ABDW" type brake equipment as used in the adaptor car illustrated in FIG. 1. The pressure levels at which switches 168, 170 and 172 operate are illustrated at points PS-1, PS-2 and PS-3, respectively. The operation of the switches 168, 170 and 172, operative at 20 psi, 40 psi and 60 psi levels have been previously described in connection with FIG. 3. As can be seen, manual control by switch 166 (FIG. 3) results in a more desirable response curve.

When the brakes are to be released, as when pressure switches 168 (PS-1), 170 (PS-2) and 172 (PS-3) are not applied, pressure will be relieved from the braking system in accordance with the curved lines extending from close to 60 psi towards zero. If the switch is used and manually set on the "Release" position, the brakes will release sharply from full service towards zero in accordance with the dash-dot line extending downwardly in the chart.

As previously described, application of the brakes is obtained by disconnecting the source of power from the solenoid operated valves 92 and 94, which remain open to permit maximum air pressure to be applied to the rate reservoir 96 which in turn permits maximum brake pressure to be applied from the storage reservoir 84 to the brake cylinder 100.

The system described in connection with FIG. 2 is included in all the cars in the train system. A locomotive supplies the main source of air pressure to all of the cars. An adaptor car may be used to convert the conventional controls in a typical locomotive to produce the signals required in all the cars embodying the system of the present invention. As mentioned a brake controller is used and may be controlled by manual controls in the locomotive if an adaptor car is not used.

The various operations described take place in all of the cars simultaneously. There is no delay caused by propagation of the air pressure through the cars. The actuating pressures are already in all of the cars subject to control by electrical signals from a central control position and brake controller circuit.

Various features relating to safety emergency conditions and warning indications have been built into and are compatible with the operation of the system embodying the invention.

What is claimed is:

1. In combination with a railway car having air cylinder operated brakes to retard the movement of the car,
   a. a source of air pressure;
   b. regulator means connected to said source of air pressure to produce a regulated constant output air pressure therefrom;
   c. a reservoir for receiving air pressure from said regulator means;
   d. electrical means connected between said regulator means and said reservoir for selectively controlling the time durations that air pressure is applied from said regulator means to said air reservoir to thereby control the amount of air pressure in said reservoir;
   e. pressure responsive valve means connected between said source of air pressure and said brake cylinder to supply a variable pressure to said brake cylinder in accordance with the amount of air pressure applied to said valve means; and f. means for connecting the air pressure from said reservoir to said pressure responsive valve means to thereby control the air pressure from said source to said brake cylinder in accordance with the amount of air pressure in said reservoir.

2. The combination as set forth in claim 1 wherein said electrical means comprises a source of power and first and second electrically operated valves responsive to be selectively opened or closed by power from said source.

3. The combination as set forth in claim 2 wherein said first and second electrically operated valves are connected in series and the air pressure from said regulator means passes in sequence to said first valve to said second valve and to said reservoir.

4. The combination as set forth in claim 3 wherein said first and second electrically operated valves are open when no power is applied thereto from said source to permit air pressure to pass from said regulator means to said reservoir.

5. The combination as set forth in claim 4 wherein power from said source applied to said first electrically operated valve causes it to close to block the passage of air pressure from said regulator means to said reservoir so as to maintain the pressure in said reservoir.

6. The combination as set forth in claim 5 wherein power from said source applied to said second electrically operated valve with no power being applied to said first electrically operated valve causes the second valve to operate blocking the flow of air pressure from said regulator means to said reservoir, while exhausting any pressure in said reservoir to the atmosphere.

7. The combination as set forth in claim 2 wherein said electrical means further comprises first and second control relays connected to said first and second electrically operated valves, respectively, with said first and second electrically operated valves comprising first and second solenoid operated valves, respectively.

8. The combination as set forth in claim 7 wherein said electrical means further comprise a brake control circuit including means for selectively connecting or disconnecting said source of power to or from said first and second control relays for adjustable lengths of time.

9. The combination as set forth in claim 8 wherein said means for selectively connecting or disconnecting said source of power to or from said first and second control relays for adjustable lengths of time comprises one or more interval relays.

10. The combination as set forth in claim 9 wherein control means including pressure responsive switches are provided to actuate one or more of said interval relays and selectively connect or disconnect said source of power to or from said first and second control relays for adjustable lengths of time.

11. The combination as set forth in claim 10 wherein a plurality of said interval relays are connected to a corresponding plurality of pressure switches, with said plurality of pressure switches becoming operative at progressively higher pressure levels to progressively actuate more than one of said interval relays to increase the lengths of time that said source of power is disconnected from said first and second control relays.

12. The combination as set forth in claim 11 wherein said electrical means further include a release and maintain relay between said source of power and said first and second control relays, said release and maintain relay being responsive to the operating state of the first of said interval relays to connect or disconnect said source of power to one or the other of said first and second control relays to either release or maintain the pressure in said reservoir.

13. The combination as set forth in claim 12 wherein said release and maintain relay is maintained actuated when the pressure switch which operates at the lowest pressure level is maintained operative.

14. The combination as set forth in claim 13 wherein said electrical means further includes an apply control relay connected in series with said release and maintain relay and said source of power, said apply control relay being responsive to open when any one of said interval relays is operative in its interval period to thereby disconnect said source of power from said first and second control relays, for said interval period.

15. The combination as set forth in claim 14 wherein maintain and release lines are connected between said release and maintain control relay and said first and second control relays, respectively, with an electrical signal being applied to either said release or maintain line or neither dependent upon the operating state of said release and maintain control relay and of said apply control relay.

16. The combination as set forth in claim 9 wherein control means including a manually operated switch are provided to actuate one or more of said interval relays to selectively connect or disconnect said source of power to or from said first and second control relays for adjustable lengths of time.

17. The combination as set forth in claim 16 wherein said manually operated switch is connected to said plurality of interval relays to permit said manually operated switch to be selectively moved to progressively actuate more than one of said interval relays to increase the lengths of time that said source of power is disconnected from said first and second control relays.

18. The combination as set forth in claim 15 wherein emergency relay means are provided to permit connection or to disconnect said source of power to or from said first and second control relays, said emergency relay being actuated by a pressure responsive switch opening at a pressure below a predetermined level at said source of air pressure to cause maximum air pressure to be applied to said brake cylinder.

19. The combination as set forth in claim 15 wherein additional emergency relay means are provided to permit connection or to disconnect said source of power to or from said first and second control relays, said additional emergency relay means being actuated by a pressure responsive switch which opens whenever pressure exists in said brake cylinder while power is being applied to said second solenoid valve.

20. In combination with a plurality of railway cars each having brake cylinder means therein to retard the movements of said cars, a. a main source of air pressure;

b. a storage reservoir in each of said cars for receiving air pressure therefrom;

c. regulator means in each car receiving air pressure from said storage reservoir to produce a regulated constant pressure therefrom;

d. a rate reservoir in each car for receiving air pressure from said regulator means;

e. electrical means connected between said regulator means and said rate reservoir for selectively controlling the time durations that air pressure is applied from each of said regulator means to said rate reservoirs to simultaneously control the amount of air pressure in the rate reservoir in all of said plurality of cars;

f. pressure responsive valve means in each car connected between said storage reservoir and said brake cylinder means to supply a variable pressure to said brake cylinder means in accordance with the amount of air pressure applied thereto; and g. means in each car connecting the air pressure from said rate reservoir to said pressure responsive valve means to control the braking pressure applied from said storage reservoir to said brake cylinder means.

21. The combination as set forth in claim 20 wherein said electrical means comprises a central source of power and first and second electrically operated valves in each car responsive to be selectively opened or closed by power from said central source.

22. The combination as set forth in claim 21 wherein said first and second electrically operated valves are open to permit air pressure to pass from said regulator means to said rate reservoir when no power is applied from said central source.

23. The combination as set forth in claim 22 wherein power from said central source applied to said first electrically operated valve causes it to close to block the passage of air pressure from said regulator means and to maintain the pressure in said rate reservoir.

24. The combination as set forth in claim 21 wherein power from said central source applied to said second electrically operated valve with no power being applied to said first electrically operated valve causes the first valve to remain open while the second electrically operated valve closes and blocks the flow of air pressure from said regulator means to said rate reservoir with its exhaust port opening to exhaust any pressure in said rate reservoir.

25. The combination as set forth in claim 24 wherein said first and second electrically operated valves are pneumatically connected in series and the air pressure from said regulator means passes in sequence to said first valve to said second valve and to said rate reservoir.

26. The combination as set forth in claim 25 wherein said electrical means further comprises first and second control relays connected to said first and second electrically operated valves, respectively, with said first and second electrically operated valves comprising first and second solenoid operated valves, respectively.

27. The combination as set forth in claim 26 wherein said electrical means further comprise a brake control circuit including means for selectively connecting or disconnecting said source of power to or from said first and second control relays for adjustable lengths of time.

28. The combination as set forth in claim 27 wherein an emergency pressure switch connected to said storage reservoir and opening at a pressure below a predetermined safe operating level is provided in each of said cars.

29. The combination as set forth in claim 28 wherein said emergency pressure switches are electrically connected in series with similar switches in each of the other cars, so that when anyone of them opens in response to an unsafe pressure condition in its associated storage reservoir, said first and second control relays are disconnected from said source of power, causing maximum pressure to be applied to the brake cylinders in all of said cars.

30. The combination as set forth in claim 27 wherein pressure responsive switches which open at a low pressure are connected pneumatically to the brake cylinders on each of said plurality of cars so that pressure in any brake cylinder causes its associated switch to open.

31. The combination as set forth in claim 30 and additional emergency relay means, said pressure responsive switches opening when there is pressure in their associated brake cylinders, said pressure responsive switches being connected in series electrically so that the opening of any one of them while power is being applied to said second electrically operated valve will actuate said additional emergency relay means to disconnect said source of power from said first and second control relays thereby causing maximum pressure to be applied to the brake cylinders in all of said cars.

32. The combination as set forth in claim 31 wherein switch means are provided as part of said brake control circuit to enable the manual selection of one of three operating modes, said modes consisting of a normal operating condition or run, a parking condition enabling safe disconnecting of electrical lines between said cars or park safe, and a mode which allows movement of some number of said plurality of cars without causing brake application which would normally result from separation of said cars or set out.

33. The combination as set forth in claim 27 including wheel bearings in each car wherein a hot box warning system is provided for said plurality of cars comprising a series of parallel wired thermostatic switches disposed on the wheel bearings in each car, indicating means, and means for operating said indicating means when the bearing temperature exceeds a preset level.

* * * * *